Dec. 5, 1944.  R. E. HINES  2,364,212
COLLET CHUCK
Filed July 22, 1943  2 Sheets-Sheet 1
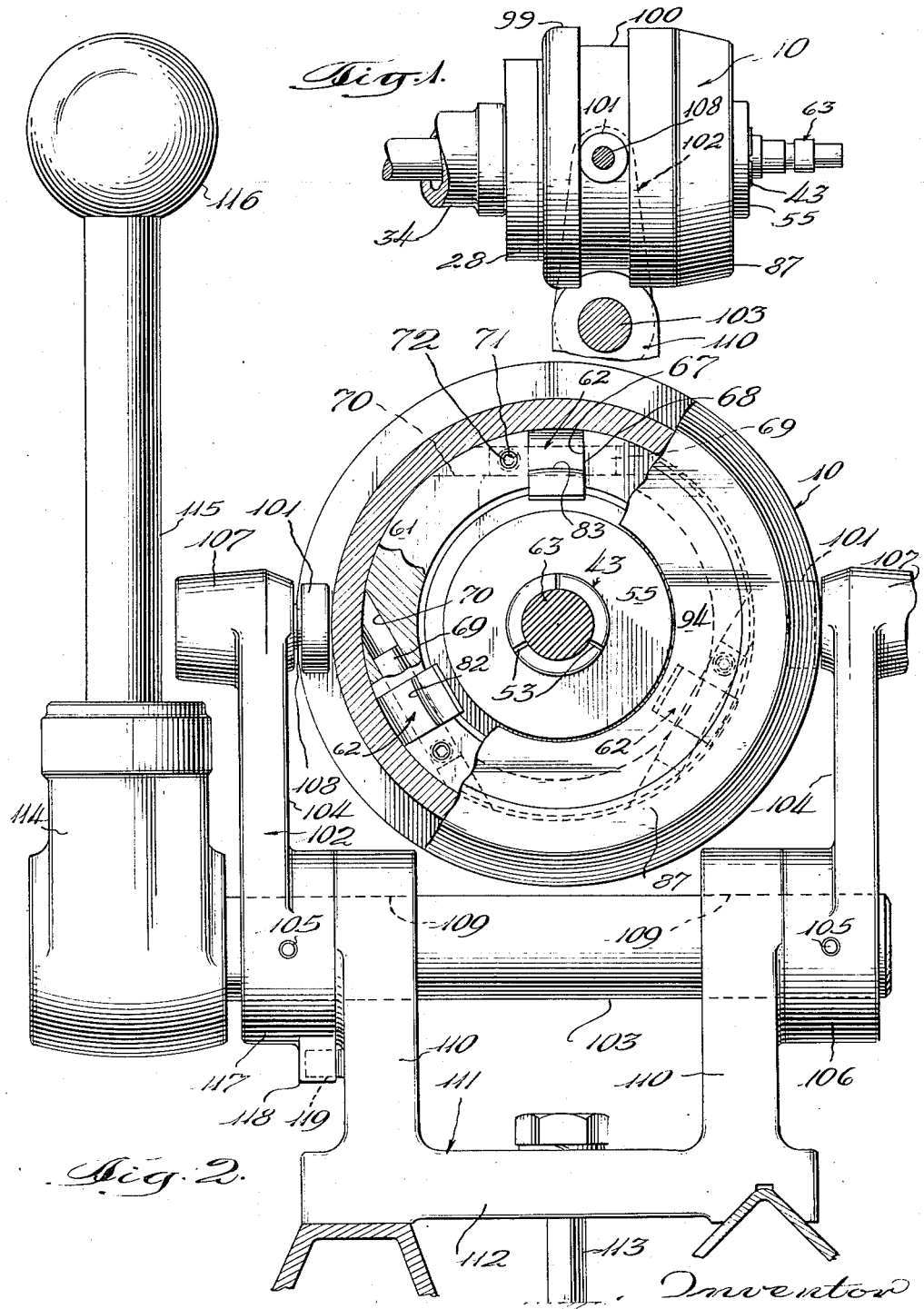

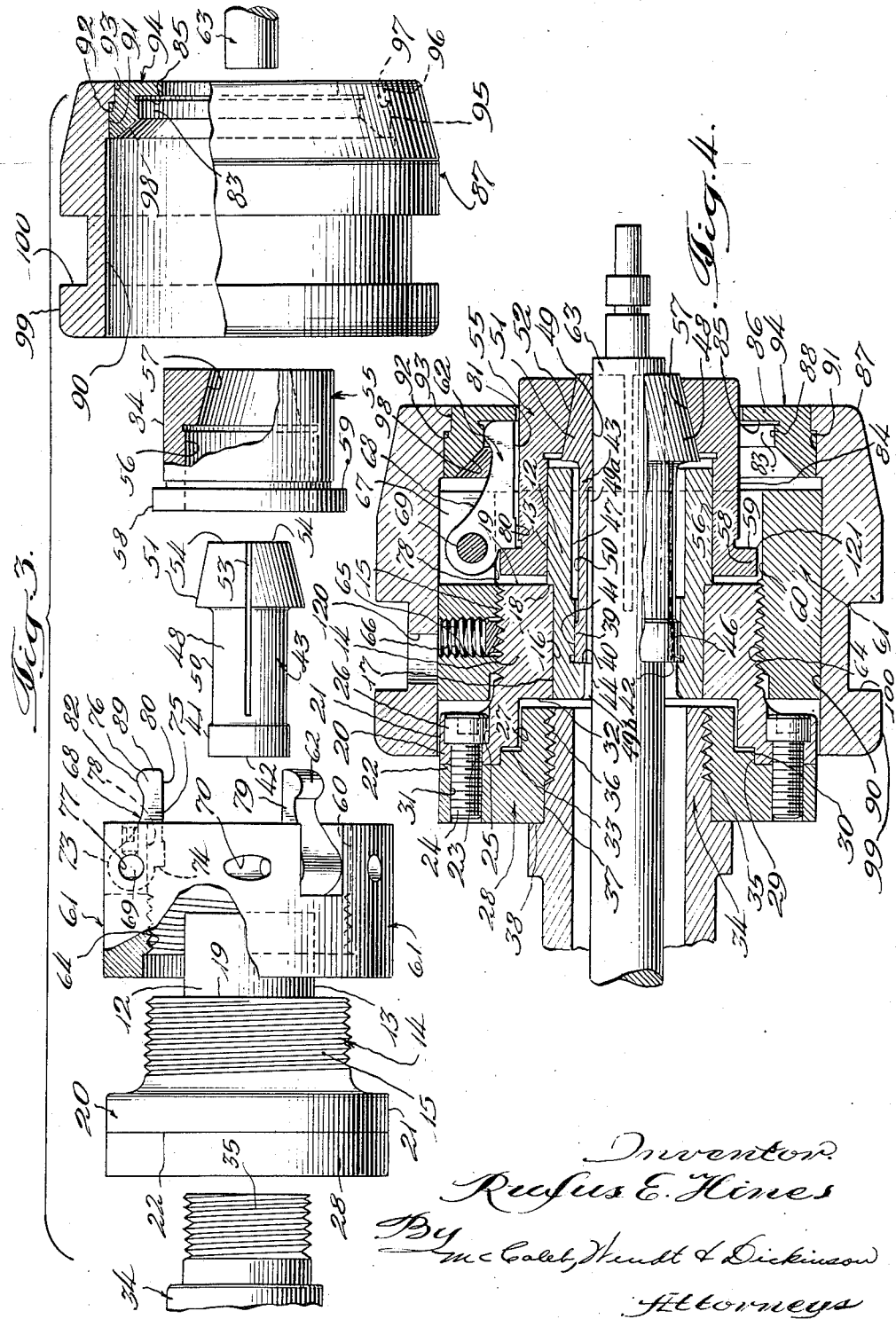

Patented Dec. 5, 1944

2,364,212

UNITED STATES PATENT OFFICE 2,364,212

COLLET CHUCK

Rufus E. Hines, Chicago, Ill.

Application July 22, 1943, Serial No. 495,683

5 Claims. (Cl. 279—50)

The present invention relates to collet chucks, and is particularly concerned with the provision of an improved collet chuck for use with lathes or milling machines in production work.

One of the objects of the invention is the provision of an improved collet chuck which is adapted to secure or to release the work piece while the chuck of the lathe or milling machine is still rotating, so that it is not necessary to stop the machine when it is desired to remove one work piece from the chuck and to place another in the chuck.

It is well known that in production work, the time consumed in stopping, decelerating, starting and accelerating the machine is an important factor in the cost of the products made. In a machine operation requiring one or one and a half minutes, as much as one half minute may be consumed when the work is finished, in bringing the chuck to a stop, so that the article may be removed from the chuck, and another work piece inserted in the chuck, and in bringing the chuck up to working speed again. The time so wasted is proportionally larger in operations which require only a short period of machining than it is where the machining operations take a longer period of time.

One of the objects of the invention is the provision of a production collet chuck, which is adapted to effect a saving in the time of production, by reason of the fact that it is not necessary to stop and start the machine when removing or inserting a work piece in the chuck.

Another object is the provision of an improved collet chuck which is adapted to be tightened upon a bar or other member without drawing the collet either backward or forward in an axial direction so that when a bar is set to project a certain distance, it will be secured in the chuck in that position.

Another object of the invention is the provision of an improved collet chuck of the class described which is adapted to be tightened or released at the forward end of the spindle, and while the chuck is rotating, which has a minimum amount of over-hang, thereby making the collet more rigid, which is provided with a simple and effective means for actuating and securing the collet, and in which all of the parts are substantially enclosed against entrance of dust or shavings.

Another object is the provision of an improved and simple collet chuck, the contracting elements of which are not likely to jam and fail to release, and in which the pressure of the gripping elements may be conveniently adjusted, and the parts of which are so arranged that there is no part subjected to undue strains which it is incapable of withstanding.

Another object of the invention is to provide an improved collet chuck of the class described which is rigid in its action and adapted to have its parts manufactured with perfect concentricity at a low cost and which is adapted to release or to secure firmly the collet, with a minimum amount of movement of the actuating parts of the chuck.

Another object of the invention is to provide an improved collet chuck which utilizes fully the power of its elements to grip the work piece firmly yet resiliently, which is simple and rugged in construction, economical in manufacture, compact, and capable of being used for a long period of time without getting out of order and without undue wear on any of its parts.

Another advantage of my improved collet chuck is that the actuating member or closing member of the chuck is free to rotate to bring into play new surfaces for engagement with its actuating fingers, so as to equalize wear which may occur on these parts during long use of the chuck.

Other objects and advantages of the invention will be apparent from the following description and the accompanying drawings, in which similar characters of reference indicate similar parts throughout the several views.

Referring to the two sheets of drawings accompanying this specification,

Fig. 1 is a side elevational view in partial section, of a collet chuck embodying the invention, and mounted upon the spindle of a lathe.

Fig. 2 is a full size end elevational view of the chuck, with its actuating mechanism for securing and releasing the work piece, the actuating mechanism being mounted on the bed of the lathe.

Fig. 3 is an exploded view in side elevation and partial section, showing the parts of the chuck in the order of their assembly.

Fig. 4 is a full size vertical sectional view of the chuck, taken on a plane passing through the axis of the spindle of the lathe.

Referring to the drawings, 10 indicates in its entirety my improved collet chuck, which is shown in connection with the spindle nose of a lathe. The collet chuck 10 is provided with a metal body 12, having an accurately machined, round and polished outer cylindrical surface 13.

The metal body 12 is preferably carried by a supporting collar 14, which may be provided with a cylindrical bore 16, adapted to receive with a tightly pressed frictional fit the reduced cylindrical portion 17 of the body 12. This reduced cylindrical portion 17 is separated from the cylindrical surface 13 by an annular shoulder 18, and in some embodiments of the invention the body 12 and the supporting member 14 may be one integral member. The reduced cylindrical portion 17 is pressed into the bore 16, until the annular shoulder 18 engages the plane end 19 of supporting member 14.

The supporting member 14 is provided with the outer threaded surface 15 and with a radially extending attaching flange 20 having an outer cylindrical surface 21 and a plane annular face 22. The attaching flange 20 preferably has a plurality of regularly spaced bolt apertures for receiving the bolts 24, and the flange has an equal number of counterbores 25 for receiving the heads 26 of the bolts 24.

The supporting member 14 also has a counterbore 27 for receiving the reduced cylindrical end portion of a threaded collar 28, and a second counterbore 29, may be provided in the attaching flange 20, for receiving the cylindrical portion 30 on the collar 28. The cylindrical surfaces 29 and 30, on the supporting member 14 and threaded collar 28 serve to assure the concentricity of the chuck body with the threaded collar 28. The bolts 24 pass through the flange 20, and are threaded into the bores 31 in the collar 28.

There is preferably a clearance between the annular surfaces at the points 32, 33, so that the plane surface 22 of the attaching flange 20 may engage the collar 28 without interference at the points 32, 33.

The collar 28, is adapted to engage the nose 34 of a lathe spindle which is provided with threads at 35 for engaging complementary threads 36, in the collar 28, and the nose 34 and collar 28 are also provided with the closing fitting cylindrical surfaces at 37, and the engaging plane surfaces at 38 to assure the firm and concentric support of the chuck body 12 on the nose of the lathe spindle. The parts 12, 14, and 28 are actually fitted and secured together before the grinding of the surfaces 37, 13, and other concentric surfaces of the chuck, so as to assure concentricity of all of the surfaces of the chuck which should be so.

The chuck body 12 is provided with an accurately ground cylindrical bore 39 terminating in an abrupt annular shoulder 40, for engaging complementary cylindrical surface 41 and plane end surface 42, respectively, on the collet 43. Body 12 also has a through counterbore 44 for passing the work piece, and bore 44 may be larger than the bore 49 in the collet 43, so that a number of similar collets of different bore sizes 44 may be used in the same chuck.

The body 12 preferably has a clearance groove 46 adjacent the annular shoulder 40, and an enlarged counter bore 47 surrounding the expanding portions 48 of the collet 43, so as to provide room for expansion of the collet 43. The collet 43 comprises an accurately machined and polished metal member having an axial through-bore 49 which has a close but sliding fit with a work piece of predetermined cylindrical shape and size.

Like the collet in my prior application, abovementioned, the collet 43 herein is intended to grip the work or stock only at the right end of the collet in Fig. 4, over a predetermined length of the bore 49, which is indicated by the distance between the right end of the collet and the shoulder 49a indicating the beginning of a clearance. There is a clearance 49b extending from 49a to the seated end of the collet and a greater clearance in the body 12 at the bore 44. Such collets are provided in the proper size for round bars that are used in them, and the clearance is necessary because such bars may vary a few thousandths in production in their diameters.

It will be evident that if the bar is exactly the same size as the collet, its cylindrical surface would fit within the curvature of the cylindrical gripping surfaces of the bore 49 on the collet. The length of these gripping surfaces is sufficient to hold the work firmly in axially centered position, and a high degree of accuracy is attained by this chuck, as evidenced by measurement of the concentricity a short distance out from the place where the chuck grips the work.

If the work piece happens to be slightly bigger than the bore 49 in the collet, such as a few thousandths, then obviously the two cylindrical surfaces of the collet and the bar will not fit perfectly, but the collet will grip the work at each of its legs, the contact being at the edges of each slot 53 in the collet, effecting a grip of the work by means of six lines of contact. If the stock happens to be smaller in diameter than the bore 49 of the collet, such as a thousandth, then obviously the cylindrical surface of the bar will not fit the cylindrical bore 49 in the collet because the bar is smaller; but there will be a line of contact between the bar and the collet midway between the slots of the collet, effecting a grip by three lines of contact.

One of the most important advantages of the present chuck is that it can be used to grip a work piece, however short, and stock can be used up down to the very last end of the bar, since the gripping takes place along the bore 49 at the end of the collet where work is being done.

In addition to the parts already described, the collet 43 also has a reduced cylindrical surface at its middle portion 50, and it preferably has a larger head 51. The head 51 has a frusto-conical camming surface 52, and that end of the collet which carries the head, that is the receiving end of the collet, has a plurality of equally spaced, axial slots 53, which extend not only through the head 51, but backwardly into the body of the collet through the middle portion 50 of the collet, stopping short of the cylindrical portion 41 of the collet.

These slots 53 separate the receiving end of the collet 43 into three work gripping portions or jaws 54, and the length of the slots 53 is such that the jaws 54 have a high degree of flexibility. Thus it requires only a very small axial force to cause the jaws to grip the work.

The closing member of the chuck is indicated by the numeral 55, and it comprises a sleeve-like metal member having an accurately ground cylindrical bore 56 for engaging the cylindrical surface 13 on the body 12, with which the closing member telescopes. At its forward end, that is the right end in Fig. 4, closing member 55 has a radially, and inwardly extending body, which is provided with a through-bore 57, having a frusto conical surface for engaging the complementary frusto conical surface 52, at the head 51 of the collet of the chuck.

At its inner or opposite end, the closing member 55 has a radially and outwardly extending annular flange 58, having an annular thrust surface 59. Flange 58 is small enough to be received in the bore 60 of the supporting cage 61, for the actuating fingers 62. The action of the closing member is that as it slides inward, that is toward the left in Fig. 4, conical surface 57 cams the conical surface 52 on the collet 43, and causes the jaws 54 to contract and grip a work piece 63. The accurately frusto conical surfaces 52, 57 (with respect to the axis of the chuck and spindle), align and support the receiving end of the collet 43 in proper axial position.

The cage member 61 comprises a substantially cylindrical metal member having an internally threaded portion 64, for engaging the threads 15, on the supporting member 14, of the body 12. By means of threads 15, 64 the cage member 61 may have its axial position adjusted as desired, for the purpose of adjusting the gripping tension at jaws 54, and of the fingers 62, as will be further described. Cage member 61, preferably has a threaded radial bore 65, for receiving the slotted set screw 66, which engages member 14, to clamp the cage in any desired rotative and axial position on the body 12, 14.

The cage member 61 is provided with a plurality, preferably three in number, equally spaced, axially extending slots, in that end of the cage member which is toward the receiving end of the chuck, that is the right end in Fig. 4. These slots have been indicated by numeral 67, and each slot 67 is adapted to receive one of the pivoted fingers 68, which are pivoted on the pins 69.

The pins 69 are mounted in the bores 70 which extend across the slots 67, and are located at right angles to the radius which extends from the axis of the chuck at the center of each slot. Each bore 70 also communicates with a threaded bore 71 for receiving a socketed set screw 72 which clamps the pivot pin 69 in place.

The fingers 68 are identical in construction, and each finger comprises an elongated member preferably constructed of spring steel provided with a bearing portion 73, a thrust shoulder 74, and an elongated resilient and relatively slender arm 75, having a cam head 76 at its end. The bearing portion 73 is an enlargement at the pivoted end of the finger, having a transverse through-bore 77, of cylindrical shape for receiving the pivot pin 69 and serving as a bearing.

The thrust shoulder 74 is a radially extending surface or shoulder, located on the inner side of each finger, for engaging the thrust surface 59, on the closing member 55. The bearing portion 73 may have a substantially cylindrical edge surface, extending from the thrust shoulder 74, and is of such size as to clear the inside of the unthreaded portion of the bore 78, in cage 61.

The arm portion 75 of each finger 68 is made slender and elongated to increase its resilient qualities, but it is also relatively stiff so that the collet will grip the work piece firmly but resiliently. The fingers may be provided with a plane surface 79 on each side, and with a plane surface 80 on that edge which is adjacent the closing member 55, which also clears the fingers at 81.

The cam portion 76 of each finger 68 may comprise a small enlargement at the free end of each finger, having that side which is opposite to the closing member 55 provided with a partially cylindrical surface 82. The size of this cam enlargement 76 is such that it may be received in the annular groove 83 which is defined by the outer cylindrical wall 84 of the closing member 55, the inner wall 85 of flange 86 on an actuating member 87, and the wall of the bore 88, in actuating member 87.

Each finger 68 is preferably provided with a plane end surface 89, which is adapted to serve as a stop surface, when it engages the inner surface 85 on flange 86 of the actuating member 87. All of the other parts of the chuck may be made of tool steel.

The actuating member 87 may comprise a substantially cylindrical metal member having a through-bore 90 for slidably receiving the cage member 61. At the receiving end of the chuck, that is the right end in Fig. 3, the actuating member is provided with a slightly smaller counterbore 91, an annular shoulder 92, and another slightly smaller counterbore 93.

These latter counterbores are adapted to receive the end member 94 which has the complementary external cylindrical surfaces 95, 96, and an annular shoulder 97. The end member may have a tight frictional fit in the actuating member 87, and may be pressed into place. End member 94 also has the inner frusto conical camming surface 98, leading the inner wall surface 88, the latter being adapted to serve as a retaining surface, for maintaining the pressure on the fingers 68. The radially inward extending flange 86, on the end member 94 serves to close that portion of the chuck against dust or shavings, and serves to provide a stop surface to limit the axial movement of the actuating member toward the left in Figure 4.

The length of the actuating member 87 is preferably such that it extends over the outer cylindrical surface 21 on the supporting collar 20, so that this end of the chuck structure is also closed against entrance of dust or shavings. The actuating member 87 is also preferably provided in its outer cylindrical surface 99 with a circumferentially extending groove 100, which may be of rectangular shape in cross section for receiving the rollers 101, carried by the fork 102.

The fork 102 may take the form of a shaft 103, provided at each end with an arm 104, each arm being pinned to the shaft 103, at 105. Each arm may be a cast metal member, having a hub portion 106, for receiving the shaft 103, and having a bearing portion 107, having a suitable ball or roller bearing (not shown) for supporting the roller shaft 108.

The fork shaft 103 is rotatably mounted in the bearings 109 provided in the upwardly extending arms 110, of a fixture 111, which may have its base plate 112, so formed as to fit upon the usual guides provided on the bed of a lathe, where the fixture may be secured by means of a through-bolt 113. Fork shaft 103 is also provided with a crank fixture 114, pinned to the shaft 103, and having a bore for the cylindrical rod 115, provided with a ball 116, and adapted to serve as an actuating lever for opening or closing the chuck.

The hub 117 of the left fork arm 104 may be provided with a stop member 118, for engaging another stop member 119, carried by the adjacent upwardly extending arm 110 of the lathe fixture 111. These stops limit the clock-wise rotation of the lever 115, and prevent the lever 115 from moving so far that the actuating member 87 might come off the chuck. They also limit the range of movement of the lever 115, to a relatively small arc, so that very little movement of this lever by the operator is required to open or close the chuck.

Reference has been made to the threads 15, 64, to adjust the axial position of the cage member 61, the adjustment being secured against further movement by set screw 66. The actuating member is provided with an aperture 120, Fig. 4, to permit access to the set screw 66, without removing the actuating member 87. The threads referred to, permit a very fine adjustment of the position of the cage member 61, and hence of the fingers 68, and the fingers 68 should preferably be so adjusted that they engage the thrust surface 59, on the closing member 55, adjacent the outer corner of radially extending flange 58, that is, as close pin 69, as possible. This increases the leverage of the fingers 68 on the closing member 55, because it utilizes the shortest radius possible on the bell crank which is represented by the thrust surface 74 on finger 68, and the arm 75 of the finger 68.

The operation of the chuck is as follows: All of the concentric surfaces on the parts of the chuck are preferably ground so far as possible with the parts assembled, so that the collet of the chuck will hold the work piece 63 in accurately aligned axially located position. The chuck is shown in closed position in Fig. 4. In this position the fingers have entered the groove 83, in the actuating member 87, and the cam surfaces 82 are engaged by the cylindrical wall 88 of the actuating member 87. In this position the fingers 68 exert only a radial force on the wall 88, and there is no force exerted by the fingers which would tend to open the chuck. Surface 88 is adapted to act as a keeper on the fingers to hold the chuck closed.

The fingers 68, being resilient, are slightly bowed, and the thrust shoulder 74 on each finger engages flange 58 on the closing member 55 to hold it in position as shown. Closing member 55 is in such position that its inner frusto conical surface 57 holds the jaws 54 in engagement with the work piece and in axial position with respect to the axis of the chuck.

When it is desired to open the chuck, it is not necessary to stop the rotation of the chuck. Operator need only throw the lever 115 toward the right, that is, clockwise, through a small arc, and the fork arms 104 acting through the rollers 101, will move the actuating member 87 toward the right in Figure 4. As this movement takes place, the finger holding surface 88 of the actuating member 87 will pass off the fingers, and the fingers 68 will ride outward on the camming surface 98 of the actuating member 87.

As the fingers 68 pivot outward, away from the closing member 55, the thrust shoulders 74 will move axially toward the right in Figure 4, permitting the closing member 55 to move toward the right also. The closing member 55 is urged toward the right in Fig. 4, by the resilient jaws 54 of the collet 43, which act on the camming surface 52 of the closing member 55. This movement is quite small, but it is found that release of the fingers, immediately causes a release of the work piece in the collet.

Thus the operator need not lose the time incident to the stopping of the rotation of the chuck, but he need only throw the lever 115 in a clockwise direction to release the work piece, while the chuck is rotating, and then the work piece may be removed and another inserted. Movement of the lever 115 in the opposite direction, that is, counterclockwise, causes the chuck to grip the work piece while the chuck is still rotating and the operator may then commence work on the work piece at once.

The closing of the chuck on the work takes place as follows: Lever 115 moves the shaft 103 and fork 102 counterclockwise, and the rollers 101 move the actuating member 87 toward the left to the position of Fig. 4. As this movement takes place, camming surface 98 on the actuating member 87 rides on the cams 82 of each finger, causing all three fingers to pivot inward toward the closing member 55 at their free ends.

This pivotal movement of the fingers continues until the fingers have their cam ends in the groove 83 where the fingers are retained until the actuating member is once more moved toward the right from the position of Fig. 4. As the fingers move pivotally inward, the thrust shoulders 74 on the fingers engage the annular thrust surface 59 on the flange 58 of the closing member 55, drawing the closing member toward the left to the position of Fig. 4.

The closing member exerts a contracting action on the free end of the collet and causes the jaws 54 of the collet to grip the work piece, but this contracting action takes place wholly in a radial direction, as the collet cannot move inward, due to its engagement at its inner end with the abrupt shoulder 40 in the body 12 of the chuck. The chuck is thus adapted to grip the work without moving the work longitudinally.

As distinguished from my prior invention, above referred to, there is the advantage in the present device, in keeping the collet or the closing member from rotating with respect to the rest of the parts of the chuck. The entire chuck is to be operated, at least most of the time, while rotating. Therefore the collet and the closing member are left free to rotate in the assembly, and this causes the fingers 68 to come into engagement with new surfaces, and prevents all the wear from taking place on certain points of the closing member at the thrust surface 59.

It will thus be observed that I have invented an improved chuck which may be opened or closed without stopping the rotation of the chuck. This chuck is peculiarly adapted to be used for production work where a large number of work pieces of the same size are to be placed in the chuck successively for work of any kind.

Much time may be saved by the use of this chuck in production work by reason of this inherent capability of my chuck. In addition the chuck is capable of very accurate work, simple in construction and operation, and capable of use for a long period of time without necessity for repair or replacement of any of its parts.

While I have illustrated a preferred embodiment of my invention, many modifications may be made without departing from the spirit of the invention, and I do not wish to be limited to the precise details of the construction set forth, but desire to avail myself of all changes within the scope of the appended claims.

Having thus described my invention, what I claim as new and desire to secure by Letters Patent of the United States, is:

1. In a collet chuck, the combination of a chuck body having an axially extending bore and an abrupt shoulder for seating a collet in said bore, with a tubular collet having an external cylindrical surface for engagement in the bore of the said body, and having a slotted receiving end with a frustoconical camming surface on its exterior, said collet having a through-bore for receiving a work piece of predetermined size, a plurality of resilient fingers pivotally mounted on said chuck body and extending in a general axial direction with respect to said body, a closing member telescopingly mounted on said chuck body and having a frustoconical inner surface for engagement with the complementary camming surface on the exterior of said collet, said fingers engaging surfaces on said closing member to urge the closing member in an axial direction to close the collet, an actuating member slidably mounted on said chuck body, said actuating member having a camming surface for simultaneously engaging all of said fingers, and means for moving said actuating member in an axial direction to cause a contraction of said fingers toward the chuck body and a closing of said collet, while the chuck and actuating member is rotating.

2. In a collet chuck, the combination of a body having means for attachment to an arbor, said body having a threaded exterior surface and a cylindrical bore, a collet supporting member in said cylindrical bore, said collet supporting member comprising a tubular metal member having a cylindrical surface fitting in said bore and having an annular surface engaging the face of said body, said collet supporting member having an internal bore and provided with an inwardly extending flange at its inner end having an annular seating surface and said collet supporting member having an external cylindrical guide surface, a collet having a cylindrical bore and having at its inner end an enlarged cylindrical surface engaged in the bore of said collet supporting member and seated against said seating surface, said collet having its outer end provided with a plurality of symmetrically located slits and with an external frusto-conical surface, a closing member slidably mounted upon said guide surface, said closing member having an internal cylindrical bore and an external radially projecting flange and at its outer end an inwardly extending flange provided with a frusto-conical bore for engaging and contracting said collet, a finger-supporting member comprising an annular member adapted to be threaded on said body, means for holding said finger-supporting member in predetermined adjusted position, said finger-supporting member having a plurality of axially projecting slots and fingers pivotally mounted in said slots, said fingers having surfaces engaging said radially extending flange, and an actuating member slidably mounted on said finger-supporting member, said actuating member having a frusto-conical inner surface and a cylindrical inner surface for engaging said fingers whereby the actuating member pivots the fingers and the fingers engage said closing member to close the collet, said actuating member holding the collet in closed position when the fingers engage said inner cylindrical surface.

3. In a collet chuck, a unitary chuck assembly adapted to be secured to a spindle, said assembly comprising a body having an axially extending bore provided at its inner end with an annular seat, said bore having a clearance at its outer end, a collet comprising a substantially cylindrical member adapted to have a substantial fit in said bore against said seat to prevent axial movement of said collet, said collet having an internal bore of a size predetermined for the stock which it is to hold and having at its outer end an outer frusto-conical surface, the outer end of said collet being provided with symmetrically located radial slits, a closing member comprising a tubular metal member slidably mounted on said body and having a radially projecting flange at its inner end, said closing member having an inner frusto-conical surface engaging the complementary frusto-conical surface on said collet and for contracting the collet into gripping engagement with the stock, a plurality of resilient metal fingers pivotally mounted on said body for pivotal movement toward and away from the periphery of said closing member, each of said fingers having a shoulder located to engage said radial flange on said closing member, an actuating member slidably mounted on said body and comprising a tubular member provided with a peripheral slot for engagement with a driving fork, said actuating member having at its outer end a tapered annular camming surface for camming said fingers radially inward as said actuating member moves axially inward, said actuating member also being provided with a stop surface for engaging the ends of said fingers, and with an annular holding surface for engaging and holding said fingers with the collet in closed position and the fingers placed under a predetermined resilient tension whereby the axial movement of the actuating member causes the collet to grip the stock without causing axial movement of the stock during the gripping action.

4. A collet according to claim 3, in which the fingers which engage the closing member are carried by a separate part mounted for axial adjustment on said body, and having means for securing said part in any predetermined adjustment whereby the resilient tension of the fingers in the closed position of the collet may be predetermined.

5. In a collet chuck, a unitary chuck assembly adapted to be secured to a spindle, said assembly comprising a body having an axially extending bore provided at its inner end with an annular seat, said bore having a clearance at its outer end, a collet comprising a substantially cylindrical member adapted to have a substantial fit in said bore against said seat to prevent axial movement of said collet, said collet having an internal bore of a size predetermined for the stock which it is to hold and having at its outer end an outer frusto-conical surface, the outer end of said collet being provided with symmetrically located radial slits, a closing member comprising a tubular metal member slidably mounted on said body and having a radially projecting flange at its inner end, said closing member having an inner frusto-conical surface engaging the complementary frusto-conical surface on said collet and for contracting the collet into gripping engagement with the stock, a plurality of resilient metal fingers pivotally mounted on said body for pivotal movement toward and away from the periphery of said closing member, each of said fingers having a shoulder located to engage said radial flange on said closing member, an actuating member slidably mounted on said body and comprising a tubular member provided with a peripheral slot for engagement with a driving fork, said actuating member having at its outer end a tapered annular camming surface for camming said fingers radially inward as said actuating member moves axially inward, said actuating member also being provided with a stop surface for engaging the ends of said fingers, and with an annular holding surface for engaging and holding said fingers with the collet in closed position and the fingers placed under a predetermined resilient tension whereby the axial movement of the actuating member causes the collet to grip the stock without causing axial movement of the stock during the gripping action, the fingers being carried on a separate part comprising a tubular metal body having internal threads for engaging complementary threads on said body, and holding means comprising a set screw threaded into said body and engaging said threads, whereby axial adjustment of the part on said body is accomplished by a rotary threading movement of said part on said body.

RUFUS E. HINES